United States Patent
Scribner et al.

[11] Patent Number: 5,851,559
[45] Date of Patent: Dec. 22, 1998

[54] TRANSFER MOLDING PRESS

[75] Inventors: Cliff J. Scribner, Chandler; Albert J. Laninga, Tempe, both of Ariz.

[73] Assignee: Motorola, Inc., Schaumburg, Ill.

[21] Appl. No.: 550,699

[22] Filed: Oct. 31, 1995

[51] Int. Cl.$^6$ .................................................. B29C 45/02
[52] U.S. Cl. ................ 425/116; 264/272.17; 264/328.4; 425/129.1; 425/145; 425/170; 425/544; 425/588; 425/DIG. 228
[58] Field of Search .................................... 425/116, 117, 425/127, 129.1, 570, 572, 588, 145, 149, 170, 544, DIG. 228; 264/272.17, 272.11

[56] References Cited

U.S. PATENT DOCUMENTS

| | | | |
|---|---|---|---|
| 3,278,992 | 10/1966 | Strauss | 425/544 |
| 4,511,317 | 4/1985 | Bandoh | 425/544 |
| 4,632,653 | 12/1986 | Plocher . | |
| 4,723,899 | 2/1988 | Osada . | |
| 4,900,485 | 2/1990 | Murakami | 264/272.17 |
| 5,125,821 | 6/1992 | Saeki et al. | 425/544 |
| 5,158,780 | 10/1992 | Schraven et al. | 264/272.17 |
| 5,413,471 | 5/1995 | Yamauchi . | |
| 5,516,271 | 5/1996 | Swenor et al. | 425/544 |
| 5,522,713 | 6/1996 | Lian | 425/544 |

*Primary Examiner*—Patrick Ryan
*Assistant Examiner*—Joseph Leyson
*Attorney, Agent, or Firm*—Kenneth M. Seddon; Daniel R. Collopy

[57] ABSTRACT

Real time distance and pressure data of a plunger (35) relative to a mold compound is provided by a compensation assembly (29) in a mold press (10). The compensation assembly has a sliding block assembly (30) which moves substantially in the same direction as the plungers (35). The sliding block assembly (30) has pressure control cylinders (33) which limit the pressure plungers (35) can apply. If the pressure on the plungers (35) should exceed this limit, the plungers (35) retract towards the sliding block assembly (30). A sensor (37) is coupled between the sliding block assembly (30) and the plungers (35) to measure the distance the plungers have moved towards the sliding block assembly (30). In one application, the sensor (37) is formed from a linear voltage displacement transducer (LVDT) so the mold press (10) can have real time pressure and distance data.

12 Claims, 2 Drawing Sheets

TRANSFER MOLDING PRESS

BACKGROUND OF THE INVENTION

This invention relates, in general, to the manufacture of semiconductor devices, and more particularly, to transfer molding presses.

Traditional mold presses use pressure applied through a physical means to transfer a molding compound into a cavity. The cavity holds a semiconductor device and shapes the compound to form a package around the semiconductor device. The encapsulating molding compounds used in the semiconductor industry have a peculiar property in that at room temperature they are a solid, but when an adequate combination of pressure, temperature, and shearing force is applied, the mold compound will fluidize and flow quite readily.

As the molding compound flows, it cross-links and solidifies to form the final composition found in semiconductor packages. The exact pressure, temperature, and flow rate of the fluidized molding compound is extremely important in order to form reliable semiconductor packages. If the pressure is too high, then the compound can bend the bonding wires of the package and cause wire sweep. If the pressure is too low, the mold compound may cross-link too early and "freeze" before forming around the semiconductor package.

One common form of mold press used in the industry is referred to as a bottom acting press, meaning the pressure is applied to the mold compound from a plunger that is moving up against the direction of gravity. Such systems have significant disadvantages in a large-scale manufacturing operation. Preferably, the part of the mold compound that should flow first is the portion that comes in contact with the semiconductor device and not the portion that comes in contact with the plunger tip. The first disadvantage with a bottom acting press is that the retracted plunger element is already at an elevated temperature. Therefore, when the mold compound is loaded into the press, it will come in contact with the hot plunger tip and begin to fluidize.

A second disadvantage is that the mold compound must be kept as close to room temperature as possible before the mold transfer process begins, a bottom acting press does not allow the semiconductor device to be preheated adequately prior to inserting the mold compound. This again causes the mold compound to prematurely flow and perhaps cross-link before adequate transfer pressure is applied. As a result, the insufficiently preheated semiconductor device may expand as the mold compound is transferred. This uncontrolled and unpredictable expansion of the semiconductor device can introduce undesirable package stress and variability into the molding process as well as reduce the reliability of the packages formed.

To improve the flow control of the molding compound, some previously known systems implement buffer devices which attempt to regulate the applied transfer pressure on the mold compound. These buffer devices are mounted opposite to the plunger such that the semiconductor device is between the plunger and the buffer device. If too high a pressure is detected on the mold compound, the buffer device will retract away from the semiconductor device in an attempt to offset the pressure being applied by the plunger. One of the drawbacks to such a system is that these buffer devices are typically made from spring coils which can lose their accuracy with time, or from gas springs which are compressible and difficult to control under high loads. A second limitation is that, as the buffer device pulls away from the semiconductor package, mold compound will begin to flow away from the cavity rather than towards or around the semiconductor package. This can affect the lifetime reliability of the package. The third drawback of such systems is their lack of accuracy in sensing the transfer pressure the plunger is applying to the mold compound. The most critical flow conditions of the mold compound occur near the plunger. The buffer device, however, is typically measuring the pressure of the mold compound at a point that is opposite from the plunger.

By now, it should be appreciated that it would be advantageous to provide an improved method for forming mold compound with improved feedback and control of the flow conditions. Such a method could be used to characterize the properties of various mold compounds and profile the operation of the transfer mold press. It would be of further advantage if the mold press could allow the semiconductor device to be pre-heated prior to applying pressure to the mold compound.

DETAILED DESCRIPTION OF THE DRAWINGS

Figure 1:
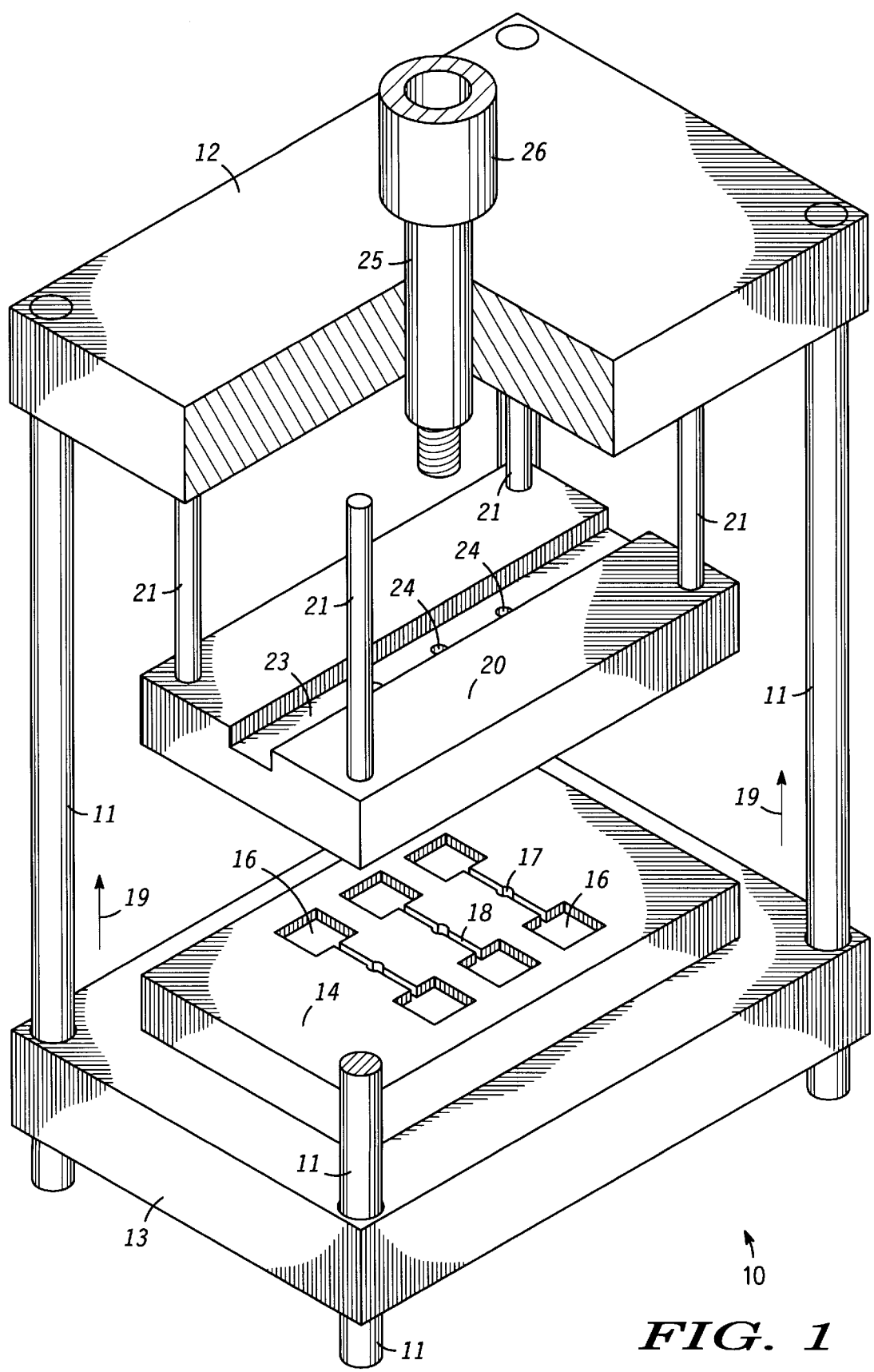
FIG. 1 is a reduced isometric view showing a transfer mold press according to the present invention.

FIG. 1 is a reduced isometric view showing a transfer mold press 10 according to the present invention. FIG. 1 is provided to show a sample application for the teachings of the present invention. As shown, mold press 10 is a top acting mold press, but it will be understood that the embodiments of the present invention are applicable to mold presses of other designs used in the semiconductor industry.

Mold press 10 comprises a plurality of tie rods 11 which provide support to a fixed platen 12 and determine the direction of motion of a moving platen 13. Moving platen 13 has at least one bottom cavity plate 14 which can have a plurality of cavities 16 to hold semiconductor devices (not shown). Cavities 16 are connected to cull surface 17 by mold channels 18. Mold press 10 also has a top cavity plate 20 which is suspended and supported by a plurality of hollow rods 21. Top cavity plate 20 also has a trench 23 which is used to hold a compensation assembly 29 (see FIG. 2). Trench 23 also has at least one hole 24 so a plunger 35 (see FIG. 2) from compensation assembly 29 can pass through top cavity plate 20 and apply pressure to a mold compound which is in a pot (not shown). The pot is conventionally mounted in top cavity plate 20. Hydraulic pressure is applied to compensation assembly 29 by a velocity controlled cylinder 25 which is fed by a hydraulic pressure source 26 mounted on the top of fixed platen 12.

Figure 2:
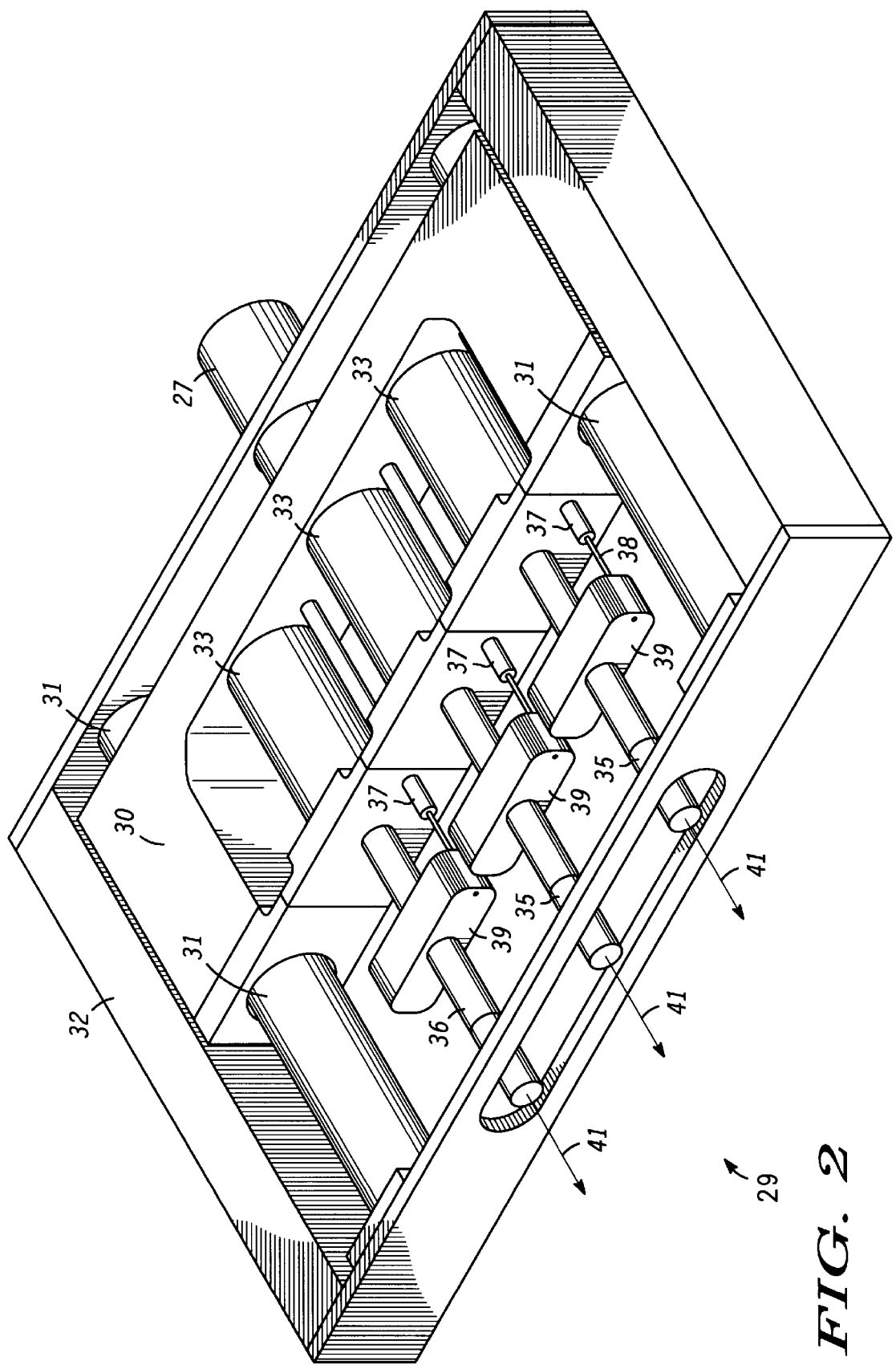
FIG. 2 is a reduced isometric view of a portion of a transfer mold press according to the present invention.

FIG. 2 is a reduced isometric view of compensation assembly 29 according to the present invention. Compensation assembly 29 is placed into trench 23 such that plungers 35 are aligned to holes 24. A fixed support assembly 32 of compensation assembly 29 is then affixed to fixed platen 12. Velocity controlled cylinder 25 is then connected to a coupling 27 which provides pressure to a sliding block assembly 30. As the hydraulic pressure is increased, sliding block assembly 30 will move in a direction determined by slide posts 31. The hydraulic pressure is also fed to pressure control cylinders 33 which regulate the amount of pressure applied to plungers 35. The hydraulic pressure from pressure control cylinders 33 is applied by shafts 36 which determine the axis that plungers 35 move along as shown by arrows 41.

Coupled to sliding block assembly 30 and plungers 35 are sensors 37 which can determine the distance plungers 35 have moved relative to sliding block assembly 30. As shown in FIG. 2, sensors 37 comprise a linear voltage displacement transducer (LVDT) which uses a core mount 38 and a bracket 39. As plunger 35 moves relative to sliding block assembly 30, core mount 38 moves proportionately and creates a change in voltage potential in sensor 37. The change in voltage is then used to calculate the distance plunger 35 has moved. Each plunger 35 shown in FIG. 2 has its own sensor 37 so distance data on each individual plunger 35 can be calculated. Sensors 37 can be formed using other coupling means such as a linear current distance transducer (LCDT) or an optical sensor coupled between plunger 35 and sliding block assembly 30.

To operate transfer mold press 10, compensation assembly 29 is placed into trench 23 and the proper hydraulic connections are made. Semiconductor devices are then placed into cavities 16 and moving platen 13 is moved in a direction indicated by arrows 19 so bottom cavity plate 14 comes in close, but not direct contact with top cavity plate 20. After the semiconductor devices have been adequately preheated and allowed to expand, bottom cavity plate 14 is put in direct contact with top cavity plate 20. A pellet of mold compound is then placed into the pots below holes 24 and the transfer process begins.

The flow of the hydraulic fluid is increased so sliding block assembly 30 and plungers 35 move towards cull surface 17. The velocity at which sliding block assembly 30 moves can be controlled and monitored by the flow rate of hydraulic fluid applied through velocity controlled cylinder 25. As plungers 35 come in contact with the mold compound pellets, the pressure on the mold compound increases until the mold compound begins to flow from the pots, onto cull surface 17, through mold channels 18, and around the semiconductor devices in cavities 16.

The viscosity and flow rate of a mold compound is extremely sensitive to the profile of pressure applied by plungers 35 and the velocity of sliding block assembly 30. If the combination of pressure and velocity is too great, then the mold compound will be too viscous and damage to the bonding wires or the semiconductor devices can occur. If the pressure is too low, then the mold compound will cross link prior to reaching its final position around a semiconductor device which will affect the reliability of the package formed. Each plunger 35 has its own pressure control cylinder 33 which can be set to a predetermined maximum value so if the pressure being applied by a plunger 35 exceeds this maximum value, the hydraulic pressure to that plunger 35 is reduced. As the pressure is reduced by pressure control cylinder 33, plunger 35 will retract relative to the other plungers 35 and move towards sliding block assembly 30. As the pressure on plunger 35 is reduced, the pressure on the mold compound will also decrease so the mold compound can then flow under the proper pressure and at the proper flow rate.

During the entire molding operation, sensor 37 provides accurate data on how far plunger 35 has moved relative to sliding block assembly 30. Distance data is also provided by velocity controlled cylinder 25 which monitors the distance sliding block assembly 30 has moved relative to cull surface 17. This data can be used to characterize the performance of various mold compounds and can be used to characterize the performance of mold press 10. By knowing real time the pressure applied on the mold compound, the distance sliding block assembly 30 has moved relative to cull surface 17, and the distance plungers 35 have moved, we can determine the exact profile of the flow rate of the mold compound around a semiconductor device. The data can also be used to ensure that plungers 35 do not exceed a set distance limit towards cull surface 17. As long as mold compound is flowing, core mount 38 and bracket 39 will not move unless the preset pressure on plunger 35 is exceeded. Therefore, sensor 37 can be used to detect if there is a problem with the flow of mold compound or if cavity 16 is filled.

In some previously known transfer mold presses, the semiconductor device is placed between the plungers and a buffer device. Such systems are designed so if the pressure applied by the plunger is too great, then the buffer device will pull away from the semiconductor device and reduce the pressure on the mold compound by allowing the mold compound to flow away from the semiconductor device. One limitation of such buffer devices is that they measure the pressure on the mold compound at a point that is furthest from where the actual mold compound is flowing. In addition, these buffer devices are typically formed from either a spring coil or a gas shock absorber. Over time, the effective spring constant of these buffer devices will degrade, which will affect the accuracy and performance of these buffer devices. Both of these limitations of previously known mold presses can cause variations in the flow rate, and direction, will affect the reliability of semiconductor packages formed.

In contrast to the above mentioned previously known process, in the present invention, compensation assembly 29 and plungers 35 are on the same side of the semiconductor device. One major improvement with the present invention is that the pressure compensating means is along the same axis as plungers 35 and thus is on the same side of the semiconductor device. Therefore, the pressure on the mold compound can be reduced without having to redirect the mold compound away from the semiconductor device. The flow of the mold compound is always directed towards the semiconductor device. Pressure control cylinders 33 determine the pressure plungers 35 are applying on the mold compound which provides improved accuracy in the measuring of the flow rate of the mold compound. Again, the present invention offers an improved method for controlling and compensating the pressure that plungers 35 are applying to a mold compound. Sliding block assembly 30 allows plungers 35 to move bi-directionally. If the pressure detected by pressure control cylinders 33 exceeds a predetermined value, then plungers 35 will move towards sliding block assembly 30.

As shown in FIG. 2, the present invention is a top acting mold press 10. Because plungers 35 do not come in contact with mold compound until the actual compression begins, the semiconductor devices can be pre-heated to retard thermal expansion during the molding operation. Such a system also prevents the mold compound from coming in contact with a warm plunger 35 which would cause the mold compound to flow prematurely.

By now it should be appreciated that the present invention provides an improved method for transferring mold compound to a semiconductor device. Compensation assembly 29, which can be used in conjunction with a transfer mold press 10, to offer improved process control and characterization of a molding operation. Since compensation assembly 29 is on the same side as plunger 35, the present invention does not redirect the mold compound away from the semiconductor device. Compensation assembly 29 also has a sensor 37 which determines the distance plunger 35 moves during the molding operation. Compensation assembly 29 provides both real time pressure and distance data on plungers 35 which can be used to characterize the flow rate and profile of various mold compounds. This data can also be used to monitor the performance of mold press 10 over time so adjustments can be made to ensure reliable semiconductor packages are formed. Mold press 10 is also a top acting system which allows the semiconductor device to be preheated and prevents the mold compound from prematurely flowing.

We claim:

1. A transfer molding press comprising:

a hydraulic pressure source;

a plurality of plungers coupled to a plurality of pressure control cylinders which are coupled to the hydraulic pressure source that move along an axis, wherein the plurality of plungers are coupled to mold compound;

a sliding block assembly coupled to the plurality of plungers, wherein the sliding block assembly moves in a direction substantially parallel to the axis of the plurality of plungers and the pressure control cylinders allow each of the plurality of plungers to apply a pressure to the mold compound that is different than the pressure applied by the other plungers of the plurality; and a sensor coupled to the sliding block assembly and to one of the plurality of plungers that measures a distance the sliding block assembly moves relative to the one plunger.

2. The transfer molding press of claim 1, wherein the sliding block assembly permits each of the plurality of plungers to retract in a direction towards the sliding block assembly when pressure on a plunger exceeds a predetermined value.

3. The transfer molding press of claim 1, wherein the hydraulic pressure source is overlying the plurality of plungers so that the transfer molding press is a top acting mold press.

4. The transfer molding press of claim 1, wherein the sensor is a linear voltage displacement transducer.

5. The transfer molding press of claim 1, wherein the sensor is an optical sensor.

6. A mold tool comprising:

a pressure source;

a first pressure control cylinder;

a second pressure control cylinder, wherein the first and second pressure control cylinder are coupled to the pressure source;

a sliding block assembly which moves bi-directionally in a plane;

a first plunger coupled to the first pressure control cylinder;

a second plunger coupled to the second pressure control cylinder, wherein the first and second plungers are coupled to the sliding block assembly so that the first plunger applies pressure to a mold compound that is greater than the pressure applied by the second plunger; and a sensor coupled to the slidina block assembly and to one of the plunders that measures a distance the sliding block assembly moves relative to the one plunger.

7. The mold tool of claim 6, wherein the hydraulic pressure source is overlying the first and second plungers so that the mold tool is a top acting mold press.

8. The mold tool of claim 6, wherein the sensor is a linear voltage displacement transducer.

9. The mold tool of claim 6, wherein the sensor is an optical sensor.

10. The mold tool of claim 6, further comprising:

a pot containing the mold compound;

a plurality of cavities connected to the pot by at least one mold channel; and a semiconductor device in each of the plurality of cavities.

11. The transfer molding press of claim 1 further comprising a plurality of pressure control cylinders coupled to the hydraulic pressure source and to the plurality of plungers so that one of the plurality of pressure control cylinders is coupled to only one of the plurality of plungers.

12. A transfer molding press comprising:

a hydraulic pressure source;

a moving platen;

a cavity plate overlying the moving platen, wherein the cavity plate has a plurality of pots connected to a plurality of cavities;

a plurality of plungers each coupled to one of the plurality of pots in the cavity plate;

a plurality of pressure control cylinders coupled to the hydraulic pressure source and each of the plurality of pressure control cylinders being coupled to one of the plurality of plungers;

a sliding block assembly that is coupled to the plurality of plungers and moves in a direction substantially parallel to the plurality of plungers, wherein the plurality of pressure control cylinders permit at least one of the plurality of plungers to apply a pressure greater than the other plungers of the plurality; and a sensor coupled to the sliding block assembly and to one of the plurality of plungers that measures a distance the sliding block assembly moves relative to the one plunger.

* * * * *

UNITED STATES PATENT AND TRADEMARK OFFICE
CERTIFICATE OF CORRECTION

| | |
|---|---|
| PATENT NO. : 5,851,559 | Page 1 of 1 |
| DATED : December 22, 1998 | |
| INVENTOR(S) : Cliff J. Scribner et al. | |

It is certified that error appears in the above-identified patent and that said Letters Patent is hereby corrected as shown below:

Column 6,
Line 6, delete "slidina" and add -- sliding --.
Line 7, delete "plunders" and add -- plungers --.
Line 31, delete "plate" and add -- platen --.
Line 31, delete "platen" and add -- plate --.

Signed and Sealed this

Seventh Day of May, 2002

Attest:

Attesting Officer

JAMES E. ROGAN
Director of the United States Patent and Trademark Office